United States Patent [19]

Muller

[11] Patent Number: 4,878,827
[45] Date of Patent: Nov. 7, 1989

[54] PLASTIC SHELL FOR FOAM MOLDINGS

[75] Inventor: John Muller, Englewood, Tenn.

[73] Assignee: Davidson Textron Inc., Dover, N.H.

[21] Appl. No.: 234,575

[22] Filed: Aug. 22, 1988

[51] Int. Cl.$^4$ .............................................. B29C 41/04
[52] U.S. Cl. ..................................... 425/434; 249/52; 249/137; 264/457
[58] Field of Search ................... 425/435, 434; 249/52, 239/99, 101, 117, 137; 264/45.7

[56] References Cited

U.S. PATENT DOCUMENTS

| | | | |
|---|---|---|---|
| 3,123,403 | 3/1964 | Hood | 264/45.7 |
| 4,284,399 | 8/1981 | Newcomb et al. | 249/117 |
| 4,610,620 | 9/1986 | Gray | 425/435 |

*Primary Examiner*—Jay H. Woo
*Assistant Examiner*—Timothy W. Heitbrink
*Attorney, Agent, or Firm*—John C. Evans

[57] ABSTRACT

For automotive interior trim molding assemblies having a vinyl skin shell, a reinforcement insert, and an intermediate reaction type polyurethane foam composition, a vinyl skin shell which has a gasket-type peripheral edge formed thereon for abutting cooperation with the reinforcement insert to prevent leakage of the foam therepast during the foam reaction period in a reaction mold. The gasket-type peripheral edge is formed on the otherwise thin shell by a tear edge, against which plastisol builds up in a substantially triangular cross section during the shell molding period in a heated slush mold.

2 Claims, 2 Drawing Sheets

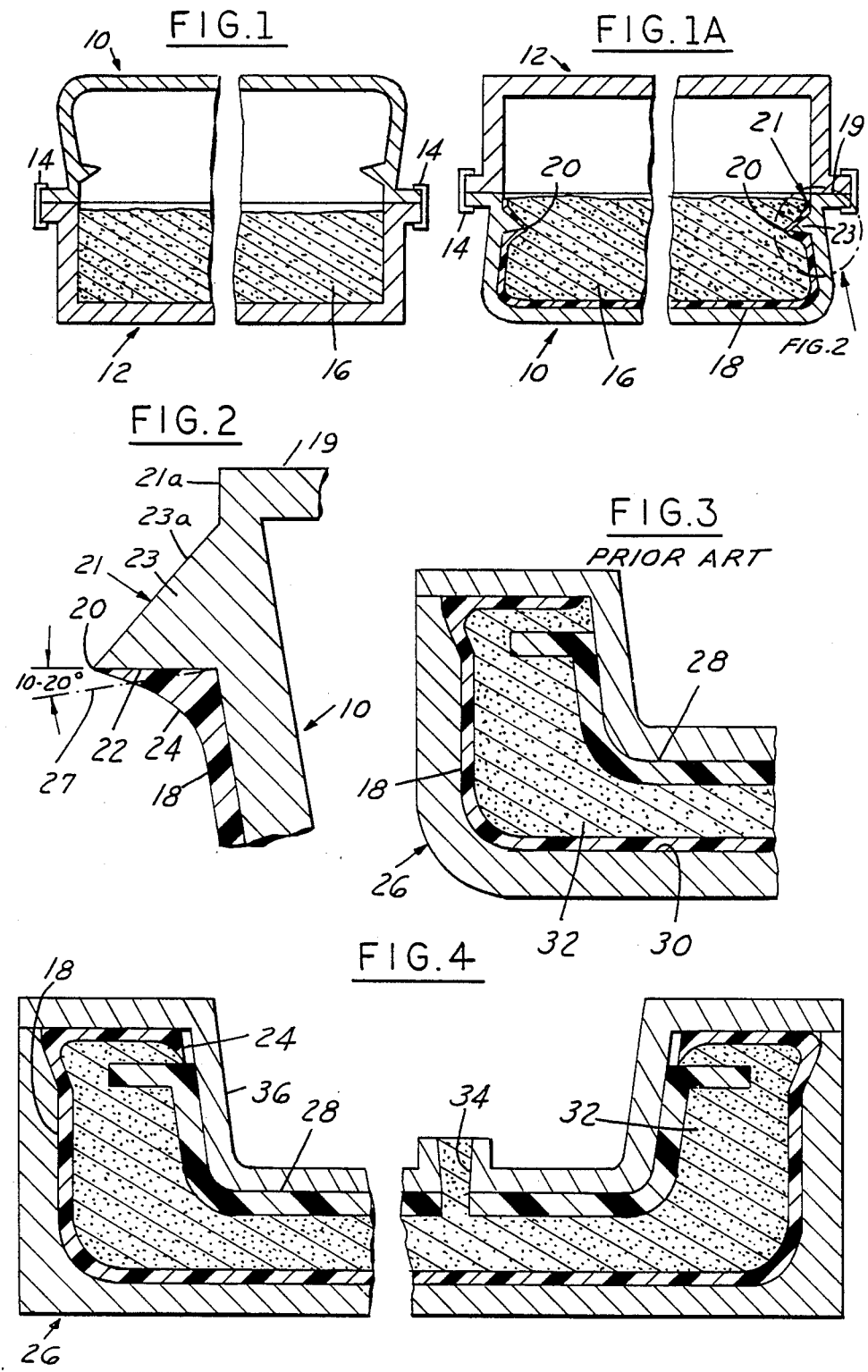

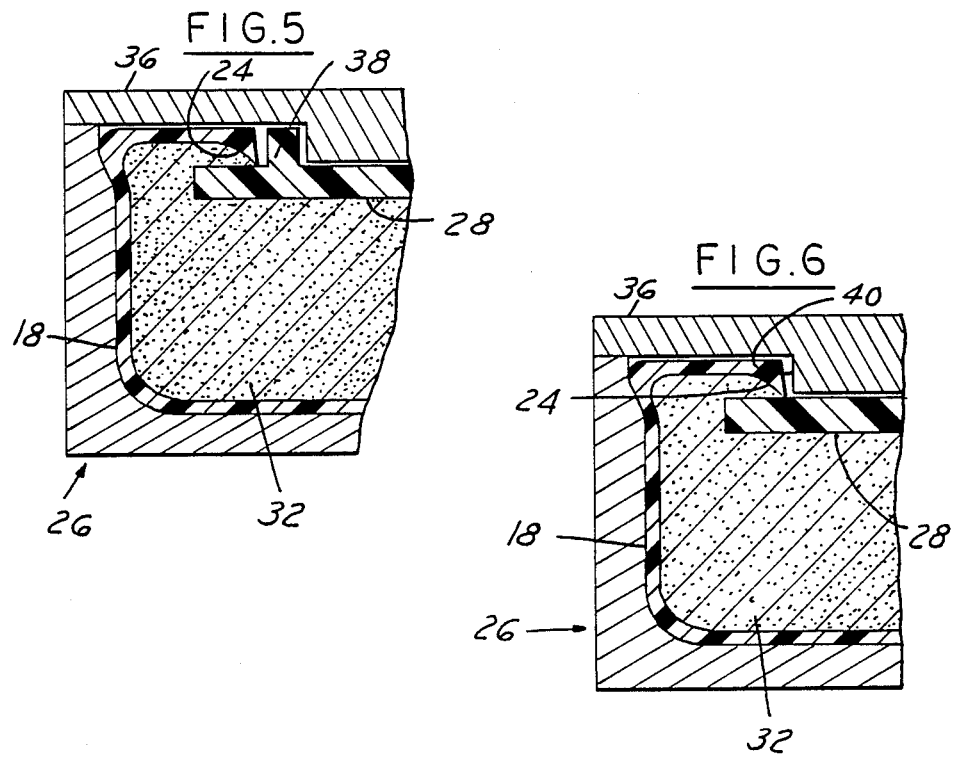

PLASTIC SHELL FOR FOAM MOLDINGS

TECHNICAL FIELD

This invention relates generally to the formation of vinyl skin shells for interior automotive trim articles and, more particularly, to forming shells so as to include a gasket type edge adapted to prevent leakage therepast, once the shells are placed in retainer molds for the addition thereto of the usual foam filler material during the polyurethane foam molding and bonding process.

BACKGROUND ART

The automotive industry has turned to the use of interior trim components such as door panels comprising a polyvinyl chloride shell. See, for example, the trim components disclosed in U.S. Pat. No. 3,123,403. The acceptance of such components has been primarily due to this type of construction accommodating a wide latitude in styling and color, and grain effects which are most desired, particularly in the interior design of automobiles.

The current state of the art includes a preformed grained vinyl shell made from dry thermoplastic powder particles which are applied to a heated shell mold from a powder box to form a continuous monochromatic one-piece shell.

Heretofore, leakage between the typical edges of vinyl shells and adjacent inserts or substrates within retainer molds has been a common occurrence, requiring very time-consuming manual cleaning of the leaked foam from the exterior surfaces of either or both the insert and/or the vinyl shell. It has also been common practice to pour more than the volume required for the particular automotive article being formed in order to assure that the desired volume remains after the leakage occurs.

DISCLOSURE OF THE INVENTION

Accordingly, a general object of the invention is to provide an improved process and apparatus for forming vinyl skin shells which are adapted to prevent leakage therepast during the foam molding process.

Another object of the invention is to provide a process and apparatus for forming vinyl skin shells wherein the shell is formed to include a gasket at its peripheral edge to serve as a seal to prevent leakage therepast during the foam molding process.

A further object of the invention is to provide a vinyl skin shell with a gasket edge for use in conjunction with a retainer mold and insert or substrate having means formed on the mold or insert which cooperate with the gasket edge to prevent leakage therebetween for some automotive applications.

These and other objects and advantages will become more apparent when reference is made to the following drawings and the accompanying description.

BRIEF DESCRIPTION OF THE DRAWINGS

FIG. 1 is a diagrammatically shown sectional view of a mold and powder box assembly in the pre-release or "mold-up" position;

FIG. 1A is a diagrammatically shown sectional view showing the powder box and mold of FIG. 1 in a powder-release or "mold-inverted" orientation;

FIG. 2 is an enlarged cross-sectional view of a portion of the FIG. 1A structure;

FIG. 3 is a fragmentary, enlarged cross-sectional view of a retainer mold with molded elements therein including a prior art vinyl skin shell;

FIG. 4 shows the retainer mold arrangement of FIG. 3 including the inventive vinyl skin shell; and FIGS. 5 and 6 are fragmentary views showing alternate embodiments of retainer mold arrangements.

BEST MODE OF CARRYING OUT THE INVENTION

In the typical vinyl shell-forming operation, a slush mold 10 is first heated, and then mounted on an open-ended powder box 12 to which it is secured by suitable clamp means 14 in what is commonly referred to as the "mold-up" position (FIG. 1). The powder box 12 contains a powder charge, represented as 16, and preferably consisting of polyvinyl chloride material. The mold 10/powder box 12 assembly is then rotated into the "mold-inverted" position shown in FIG. 1A by suitable handling equipment.

The thickness of the finished shell 18 formed along the mold 10 surface is determined by the mold temperature, typically between 250 degrees F. to 390 degrees F., and the time allotted, typically from one to ten seconds.

Thereafter, the mold 10/powder box 12 assembly is returned to the mold-up position and separated. The mold is cooled to a temperature which will facilitate removal of the shell 18 from the mold without damage. The excess powder which has not adhered to the mold has fallen back into the box 12, ready to be used again in the next cycle.

Referring now to the drawings in greater detail, the mold 10 is seen to include an inlet surface 19 and an adjacent mold surface 21. The adjacent mold surface 21 has an upper segment 21a that is formed perpendicular to the inlet surface 19. The upper segment 21a forms an inlet opening for passage of powder material into the cavity 16. The mold surface 21 also has a surface segment 21b which is slightly inclined with respect to a line perpendicular to the surface 19, as is best shown in FIG. 2. The adjacent mold surface 21 also has a ridge 23 formed between the upper segment 21a and the lower segment 21b to extend inwardly of the cavity 16. The ridge 23 includes an inclined surface 23a and a reentrant side 22 to define gasket-forming tear edges 20 of a predetermined height at selected locations therein. Each edge 20 is preferably designed to include a 10 to 20 degree angle (FIG. 2) on the side 22 thereof along which a gasket-type edge 24 is formed on the vinyl skin shell 18 while the latter is formed during the molding process. The reentrant side 22 has an angle which is 10 to 20 degrees with respect to a line 27 which is perpendicular to the lower segment 21b of the adjacent mold surface 21. Thus, the formed gasket edge 24 is substantially triangular in shape, i.e., thickest at the lowest portion thereof, and progressively thinner in the upward direction to terminate in substantially a feather edge at the high portion of the tear edge 20. All excess material outward of the tear edge 20 is cut away.

Thereafter, the vinyl skin shell 18 is manually placed in a second, so-called, retainer mold 26, onto which a suitable insert or substrate 28 is mounted so as to define a predetermined cavity 30, into which a liquid polyurethane foam, represented at 32, is poured through an inlet 34 (FIG. 4) formed through a mold lid 36 and the insert 28 onto the vinyl skin shell 18. The foam becomes secured to the shell 18 and expands until it contacts and becomes secured to the insert 28 to form the desired internal automotive article, such as a glove box door, armrest, console, or door panel. The insert 28 is of a predetermined shape, and serves as a reinforcing member and/or an attaching member to the vehicle interior.

In FIG. 3, a fragmentary prior art door panel is illustrated. It may be noted that foam is unrestricted intermediate the shell 18 and the insert 28 such that the foam is free to leak therebetween. In contrast, in FIG. 4, it may be noted that the gasket edge 24 prevents foam leakage therepast.

In particular applications, such as the formation of glove box doors, the insert 28 may include a rib 38 (FIG. 5) formed thereon or a raised surface 40 (FIG. 6) may be formed on the mold lid 36. As shown in each of the FIGS. 5 and 6, the gasket edge 24 of the vinyl skin shell 18 is positioned closely adjacent the insert rib 38 or the lid raised surface 40, say, within one millimeter therefrom. As such, the gasket edge 24 is prevented from flattening out from the pressure of the expanded polyurethane foam, and leakage of the foam 32 is prevented therepast.

It is apparent that the prevention of leakage serves to eliminate the very time consuming need to remove leaked foam from the respective outer surface of the insert 28 and/or the shell 18.

Furthermore, by virtue of the presence of the gasket edge 24, a controlled volume of liquid foam 32 may be poured into the cavity 30, in contrast to requiring a larger foam shot size to compensate for foam leakage, as has heretofore been the case. It is also believed that the possibility of "voids" is reduced by virtue of the positive confining of the foam by the gasket edge 24.

While various embodiments of the invention have been shown and described, other modifications thereof are possible within the scope of the following claims.

The embodiments of the invention in which an exclusive property or privilege is claimed are defined as follows:

1. A heated slush mold for molding a vinyl skin shell from powder material which fills the mold to cover heated surfaces thereon for forming a deposited layer of fused plastic thereon for forming a hollow shell, said slush mold comprising: a body portion having a heated deposit surface therein and an inlet surface including an upper segment defining an opening for flow of powder material into a cavity, said heated deposit surface further including a lower segment, said heated deposit surface also including a ridge portion formed on said body portion at a point between said upper segment and said lower segment, said ridge portion including an inclined surface and a reentrant surface intersecting at a sharp angle for defining a tear edge, said reentrant surface having a predetermined height and a predetermined slope formed at select areas of said mold for forming a resultant gasket edge on a shell of material fused on said deposit surface, said inclined surface having material deposited thereon that is stippable from said deposit surface for tearing along said tear edge so as to form a sharp edge on said formed gasket edge of a resultant molded shell.

2. The mold described in claim 1, wherein said predetermined slope has an angle of 10 to 20 degrees with respect to a line perpendicular to said lower segment.

* * * * *